May 23, 1961 E. INCE 2,985,414
FISHING ROD OR POLE HOLDER
Filed Dec. 22, 1958
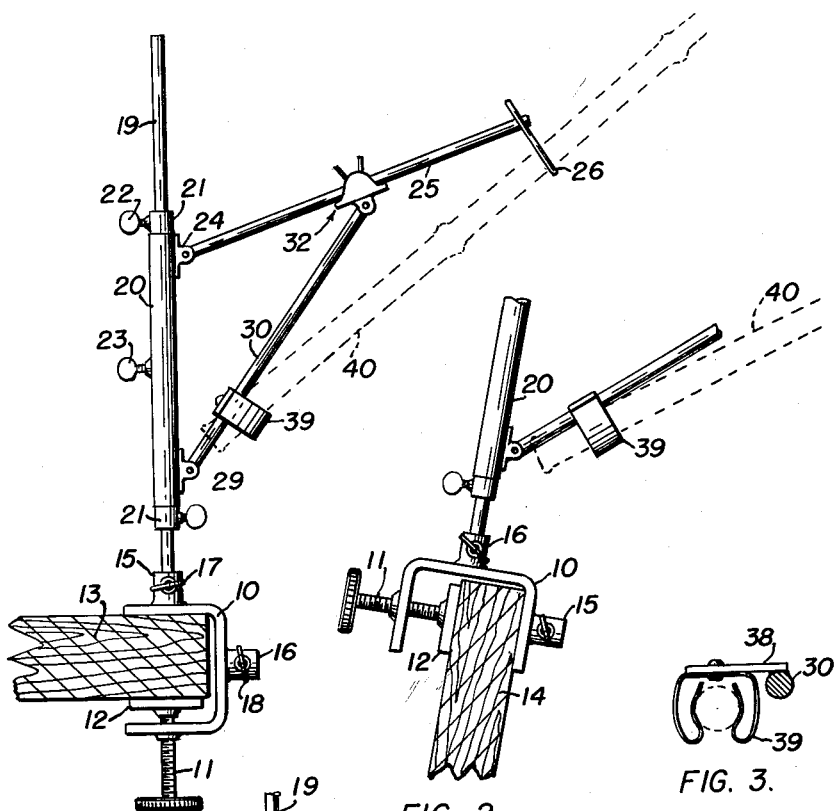
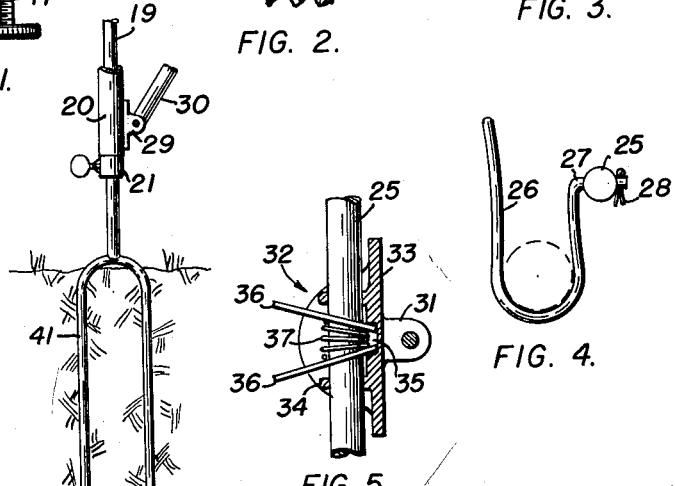
EDWARD INCE
INVENTOR.
BY *Herbert J. Brown*
ATTORNEY

United States Patent Office 2,985,414
Patented May 23, 1961

2,985,414
FISHING ROD OR POLE HOLDER
Edward Ince, 3531 Ryan Ave., Fort Worth, Tex.
Filed Dec. 22, 1958, Ser. No. 781,966
5 Claims. (Cl. 248—42)

This invention relates to rod and pole holders and has reference to a device capable of various installations, such as on the gunwales of boats, on the ends of fishing piers or in the ground.

An object of the invention is to provide a fishing rod or pole holder capable of various adjustments, that is, the angle of the supported pole or rod, vertical adjustment of the holder, or complete rotational adjustment about a vertical axis.

Another object of the invention is to provide a holder of the described class which may be readily dismantled and folded into a compact position for storage, such as in a tackle box.

A particular object of the invention is to provide a fishing rod holder wherein the lateral rod supporting arm is quickly and conveniently adjusted by means of a slide catch.

A further object of the invention is to provide a fishing rod holder which will accommodate, within a reasonable range, various handle diameters.

These and other objects will become apparent from the following description and the accompanying drawings, wherein:

Figure 1 is an elevational view of a fishing rod or pole holder in accordance with the invention and showing the same mounted on a horizontal support, such as the end of a pier.

Figure 2 is a broken elevational view similar to Figure 1 but showing the present holder mounted on the gunwale of a boat.

Figure 3 is a sectional and elevational view generally taken at a right angle with respect to Figures 1 and 2, and showing a preferred spring clip for engaging a rod or pole handle.

Figure 4 is an elevational view of a U-shaped rod or pole support pivotally mounted on the extending end of the lateral hinged arm.

Figure 5 is an enlarged sectional view of a slide catch for adjustably securing the hinged brace on the laterally extending arm, and Figure 6 is a broken elevational view of a modified form of the invention wherein the present holder is supported in the ground.

In the form of the invention shown in Figures 1 and 2 there is a C-clamp 10 having a clamping screw 11 and rotatable foot 12 for attaching the clamp to the end of a horizontal projection 13, as shown in Figure 1, or a vertical projection 14, as shown in Figure 2. There is a socket 15 on the side of the clamp 10 opposite the screw 11, and a similar socket 16 on the clamp between the screw and the first referred to socket. The sockets 15 and 16 have some screws 17 and 18 for engaging the lower end of a vertical cylindrical rod which serves as a staff or standard 19 on which there is a slidable and rotatable sleeve 20. Collars 21, having thumb screws 22, on the standard 19 at the ends of the sleeve 20 provide means whereby the present holder may be vertically adjusted. Adjustment about the vertical axis is also by means of a thumb screw 23 in the side of the sleeve 20.

Near the top of the sleeve and on one side thereof there is a hinge 24 which pivotally engages one end of a cylindrical lateral arm 25, the outer end of which is provided with a depending U-shaped rod support 26. As shown in detail in Figure 4, the rod support 26 is of heavy round stock, such as wire, and one end of which, 27, is laterally bent and is positioned through an opening, not numbered, in the outer end of the arm 25 where the extending bent end 27 is provided with a cotter pin 28.

Near the bottom of the sleeve and on the side thereof including the first described hinge 24 there is an additional hinge 29 which pivotally engages one end of a generally diagonal brace 30, the upper end of which pivotally engages ears 31 on the flat or base side of a slide catch 32. The slide catch 32 is comprised of a base 33 having spaced lateral projections 34 through which the arm 25 slides. There is a recess 35 in the base 33 on the side of and between the projections 34 which engages the inner ends of friction holding plates 36 having a coiled compression spring 37 therebetween and around the arm 25. The openings through the plates 36 are oval. Thus, by grasping the projecting ends of the plates 36 and squeezing the same together the friction engagement with the rod 25 is released.

On the same side of the arm 25 as the rod support 26 there is a lateral bracket 38 which supports a depending inverted U-shaped spring clip 39 the sides of which are bent inwardly and arcuately to engage the handle of the pole or rod 40.

The modified form of the invention shown in Figure 6 is identical with the foregoing except the supporting means. Instead of the described C-clamp 10, a prong 41 or the like is secured to the bottom of the vertical standard 19 for insertion in the ground.

In operation, the handle of the pole 40 is engaged in the spring clip 39 and in the U-shaped rod support 26 as shown in Figures 1 or 2. Vertical adjustment of the pole is accomplished by adjustment of the collars 21 on the standard 19, and rotational adjustment is by means of the thumbscrew 23. The pole or rod 40 may be quickly released by merely pressing downwardly on the handle portion thereof, using the U-shaped support 26 as a fulcrum, after which the pole or rod is handled in the usual manner.

The invention is not limited to the exemplary construction herein shown and described, but may be made in various ways within the scope of the appended claims.

What is claimed is:

1. A fishing rod holder or the like comprising a cylindrical vertical standard, a sleeve mounted on said standard intermediate the ends thereof, a stop on said standard positioned to engage the lower end of said sleeve, an arm hingedly mounted on the upper end of said sleeve, a brace hingedly mounted on the lower end of said sleeve, an adjusting slide mounted on said arm for movement along the length thereof, means hingedly connecting the remaining end of said brace with said slide, a rod support on the extending end of said arm, and a rod handle engaging clip on said brace near the lower end thereof.

2. A fishing rod holder or the like as defined in claim 1, and wherein said rod support and said rod handle engaging clip project from the same side of said arm.

3. A fishing rod holder or the like as defined in claim 1 and wherein said adjusting slide includes releasable spring means engaging said arm.

4. A fishing rod holder or the like as defined in claim 1 and wherein said vertical standard is longer than said sleeve, and means adjusting the position of said stop on said vertical standard.

5. A fishing rod holder or the like as defined in claim 4, and including a thumb screw in said sleeve engaging said vertical standard.

References Cited in the file of this patent

UNITED STATES PATENTS

| | | |
|---|---|---|
| 646,835 | Jackson | Apr. 3, 1900 |
| 1,091,491 | Ebur | Mar. 31, 1914 |
| 1,639,448 | Ashbrook | Aug. 16, 1927 |
| 1,643,557 | Goldman | Sept. 27, 1927 |
| 2,517,937 | Stanton | Aug. 8, 1950 |
| 2,833,500 | Jones | May 6, 1958 |

FOREIGN PATENTS

| | | |
|---|---|---|
| 352,844 | Germany | May 5, 1922 |
| 976,911 | France | Nov. 1, 1950 |